(12) United States Patent
Ross et al.

(10) Patent No.: US 7,172,706 B2
(45) Date of Patent: Feb. 6, 2007

(54) LIQUID SEPARATOR

(76) Inventors: Geoffrey John Ross, 428 Whippendell Road, Watford, Herts (GB) WD 18 7QU; Linda Ann Ross, 428 Wippendell Road, Watford, Herts (GB) WD 18 7QU ( * ) Notice: Subject to any disclaimer, the term of this patent is extended or adjusted under 35 U.S.C. 154(b) by 194 days.

(21) Appl. No.: 10/857,308

(22) Filed: May 28, 2004

(65) Prior Publication Data
US 2005/0056586 A1 Mar. 17, 2005

(30) Foreign Application Priority Data
Jun. 13, 2003 (GB) .................... 0313756.9

(51) Int. Cl.
*B01D 17/038* (2006.01)
*B01D 36/04* (2006.01)

(52) U.S. Cl. .............. 210/788; 210/806; 210/304; 210/456; 210/512.1; 209/12.1; 209/725; 209/734

(58) Field of Classification Search ............... 210/788, 210/806, 304, 512.1, 456; 209/12.1, 725, 209/734
See application file for complete search history.

(56) References Cited

U.S. PATENT DOCUMENTS 4,780,203 A * 10/1988 Barcy ................... 210/304
6,669,845 B2 * 12/2003 Klass ................... 210/304

FOREIGN PATENT DOCUMENTS

| GB | 1234022 | 6/1971 |
| GB | 1113621 | 5/1988 |

* cited by examiner

*Primary Examiner*—David A. Reifsnyder
(74) *Attorney, Agent, or Firm*—Richard M Saccocio

(57) ABSTRACT

A liquid separator for separating water from a mixture of water and fuel includes a flow dispersion member which serves to control the flow of the mixture into, through, and out of the liquid separator. The flow dispersion member is placed between a flow inlet channel and a separation chamber and includes a plurality of flow paths that significantly reduces turbulence into and through a separation chamber of the liquid separator thereby improving the separation of the water from the mixture. Further improvement of the separation is provided by the unique arrangement of an inlet port so as to induce a circulatory motion to the incoming mixture and thereby separate some water by centrifugal action.

11 Claims, 3 Drawing Sheets

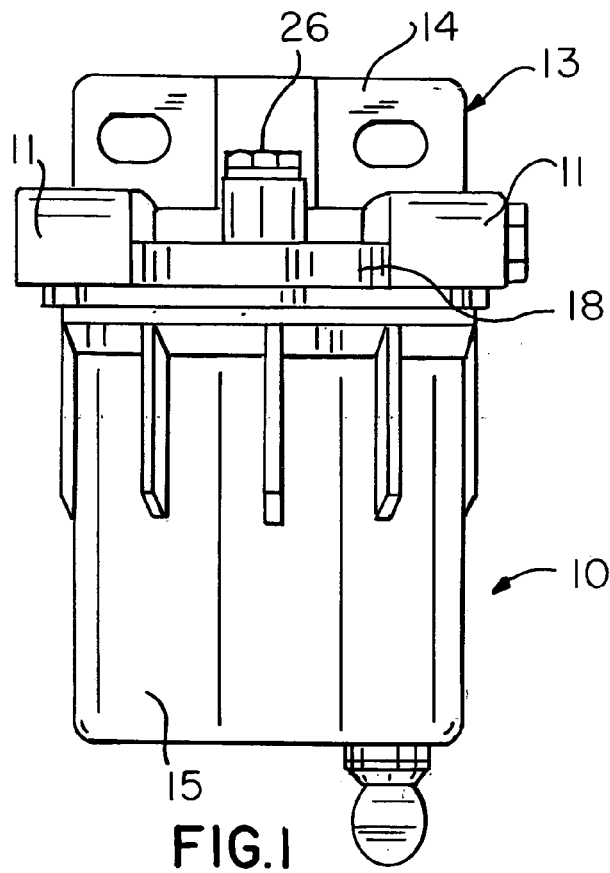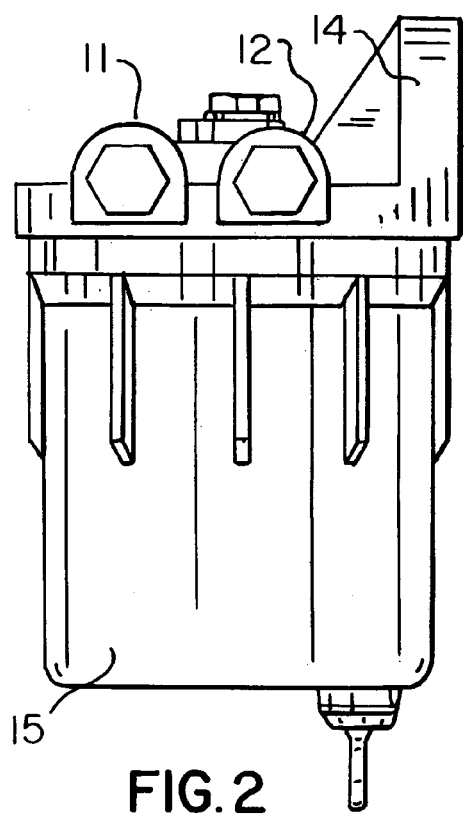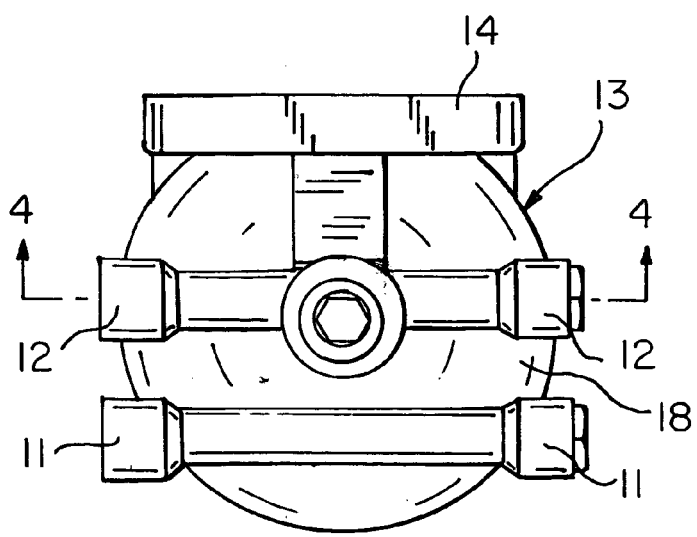

LIQUID SEPARATOR

This application claims the benefit of GB application 0313756.9, entitled Water Separator, filed on Jun. 13, 2003.

BACKGROUND OF THE INVENTION

1. Field of the Invention

This invention relates in general to liquid separators for separating heavier and lighter fractions in a mixture of liquids. More particularly, but not exclusively, the invention is concerned with the separation of water from a lighter liquid such as diesel fuel.

2. Description of the Prior Art

Water separators which are also know as water filters are used in many applications where it is desired to separate water contained within a flowing medium such as a liquid or a gas. However, the means used to separate out the water is different for a liquid or a gas. The present invention is primarily intended for use with separating water from a lighter liquid such as diesel fuel. Even more specifically, the present invention is intended to be used to separate water from diesel fuel where a pump is located downstream from a fuel reservoir and the water separator or water filter is located between the pump and the reservoir. Such an application would be for the operation of diesel engines, for example. It being known that water contained within the diesel fuel has an adverse affect on the operation of the diesel engine and indeed can cause severe damage to the diesel engine. However, the teachings of the present invention are not to be limited to the described specific application.

Prior art water filters when used in the described application, rely on the difference in densities between the water and the diesel fuel to achieve separation of any entrained water. In such prior art water filters, fuel enters an inlet port of the separator and into a bowl type of separation chamber. The fuel then enters a filter element, passes through the filter element and then out of an outlet port of the separator and on to the fuel pump. In these types of prior art water separators the water separation occurs in two stages, upon entering the separator chamber and upon passing through the filter element. The separated water collects at the bottom of the bowl which usually includes a valve to enable the separated and collected water to be drained from the bowl.

Unfortunately, the prior art water separators have been known to be relatively inefficient in separating the water from the fuel. Therefore, the fuel that is passed on to the diesel engine still contains an undesirable amount of water. As noted this undesirable amount of water can result in premature failure of the diesel engine requiring expense repairs or perhaps a new engine. The aforedescribed problem with the prior art water separators is somewhat dependent upon the fuel flow rate such that even though the problem exists with relatively low flow rates, the problem is exacerbated with increased or high fuel flow rates Accordingly, There exists a need for a water filter or separator that more efficiently and effectively removes the water trapped within or mixed with a diesel fuel and or removes a greater quantity of the trapped water within a diesel fuel.

The primary object of the present invention is therefore to provide a water filter that effectively overcomes one or more of the above-described problems associated with prior art water filters, at all flow rates.

Other objects which, although not specifically stated, are intended to be included within the scope of the present invention, are accomplished by the present invention and will become apparent from the hereinafter set forth Detailed Description of the Invention, Drawings, and the Claims appended herewith.

SUMMARY OF THE INVENTION

The present invention accomplishes the above-stated objectives as well as others, as may be determined by a fair reading and interpretation of the entire specification herein. Accordingly, in a general aspect, the present invention provides an improved water filter or separator that can be used with diesel fuels. The improved water separator includes a flow dispersion member placed between an inlet port or ports of a water filter and a separator chamber of the water filter. Thus, the dispersion member is also located upstream of a filter element used with the water separator. It is to be noted that the words "water filter" and "water separator" are used interchangeably herein and therefore refer to the same item.

The flow dispersion member, in a preferred embodiment, comprises a disc-like member positioned between the cover of the filter and the bowl portion of the filter (the separation chamber comprising the inside area of the bowl). The flow dispersion member includes a plurality of flow channels formed therethrough, and arranged to provide a plurality of flow paths between an inlet region and the separation chamber the water filter. The plurality of flow paths between the inlet region and the separation chamber provided by the flow dispersion member serve to control the incoming flow in a manner that effectively reduces, if not eliminates turbulence within the bowl of the water filter thereby improving the efficiency of the water separation procedure that occurs within the separation chamber. Further, the reduced turbulence in the separation chamber prevents the water collected within the separation chamber from vaporizing and remixing with both the once water separated fuel before it enters the filter element and remixing with the incoming fuel. In order to further increase the efficiency of the inventive water separator, the incoming flow is induced to swirl in a circular manner so that the effect of centrifugal motion also serves to separate the water from the fuel. The inventive apparatus thereby results in effective water separation and or improved separation of the water initially within the diesel fuel.

As noted, the invention herein is particularly adaptable for use with an internal combustion engine, such as a diesel engine. However, the invention is not intended to be limited to such single use.

BRIEF DESCRIPTION OF THE DRAWINGS

Various other objects, advantages, and features of the invention will become apparent to those skilled in the art from the following discussion taken in conjunction with the following drawings, in which:

FIG. 1 is a frontal view of a liquid separator or water filter as provided by the present invention;

FIG. 2 is a side view of the liquid separator of FIG. 1;

FIG. 3 is a top view of the liquid separator of FIG. 1;

DESCRIPTION OF THE PREFERRED EMBODIMENTS

Figure 4:
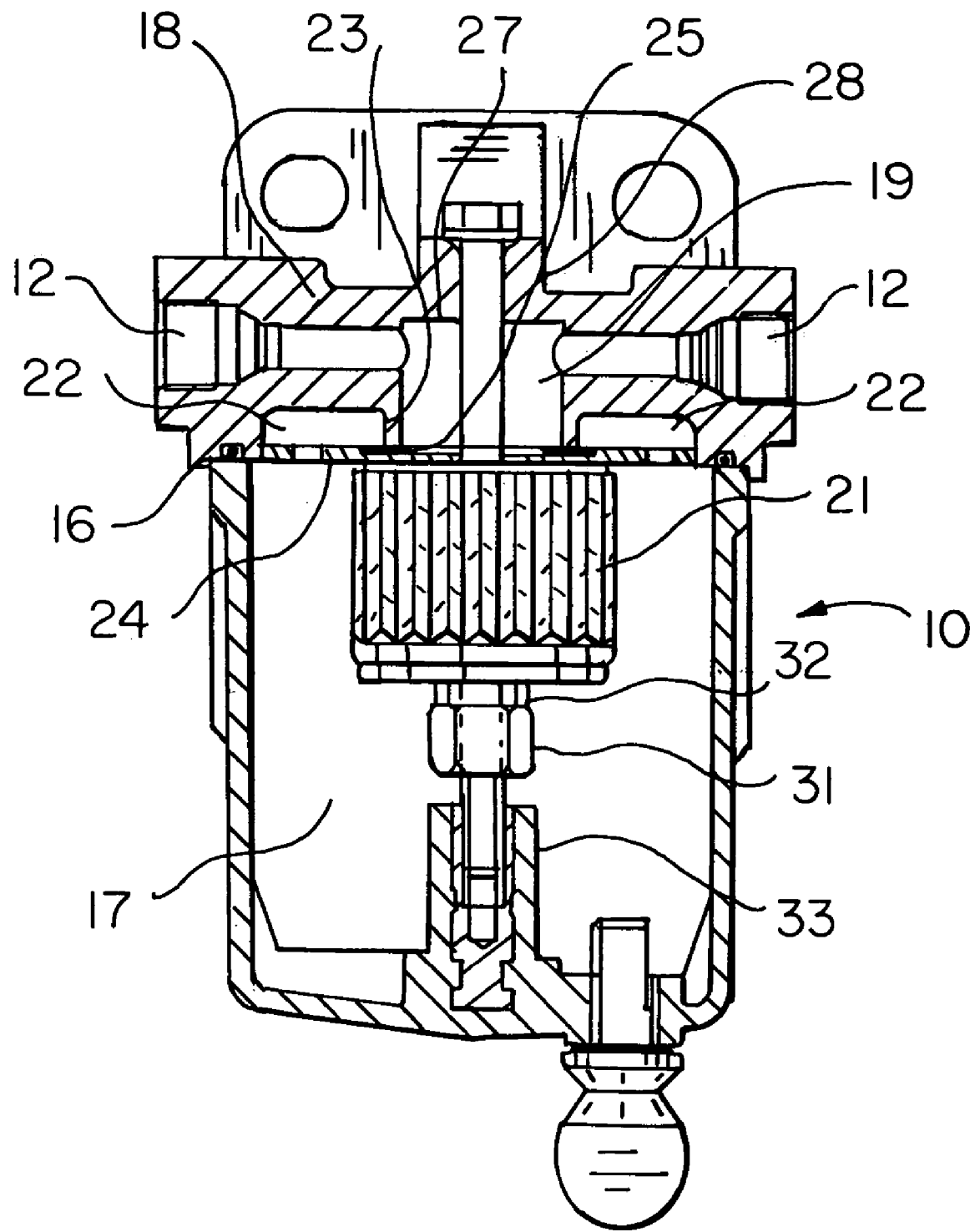
FIG. 4 is a vertical section view of the liquid separator of FIGS. 1, 2, and 3, taken along the line 4—4 of FIG. 3, and according to one embodiment of the invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. For example, the phrase "liquid separator" is considered to be synonymous with the phrase "water filter", with the phrase "water separator", and with the word "separator". Also, the phrase "flow dispersion member" is synonymous with "flow distribution member". These are but two of such examples, there are others.

Reference is now made to the drawings, wherein like characteristics and features of the present invention shown in the various figures are designated by the same reference numerals.

FIGS. 1–4 together illustrate a typical water separator 10 as provided by the present invention. The illustrated separator 10 includes dual inlet 11 and dual outlet 12 ports located at a top cover member 13 of separator 10. In operation, however, only one inlet port 11 and one outlet port 12 is used. The dual configuration simply provides for convenience of plumbing or connecting inlet and out fuel flow lines to the separator 10 depending on the mounting arrangement of the separator 10. As seen however, the inlet ports 11 are each arranged somewhat tangential to the round configuration of the cover 13. The cover member 13 also includes a bracket 14 for mounting the separator 10 to a vertical surface as is well known in the art. A lower portion of separator 10 includes a body member or bowl 15 that is sealingly attachable to the top cover member 13 such as by screw threads or any other appropriate attachment means as are well known in the art. In the example shown in FIG. 4, a central bolt 26 is used to sealingly clamp the top cover member 13 to the body member 15. An appropriate seal 16 such as an O ring seal, and sealing surfaces are provided where the cover member 13 interfaces with the body 15. In the embodiment shown in FIG. 4, in order to accomplish the clamping of the body 15 to the cover member 13 the lower end of a bolt 26 includes screw threads that threadingly mate with a sleeve member 33, having internal screw threads, provided at the central lower and inside of the bowl or body member 15. Thus, holding of the bowl 15 while tightening the head of the bolt 26 brings the bowl 15 into sealing contact with the cover member 13.

Body member 15 comprises a hollow cup-like or bowl member having a closed bottom end and an open top end, the latter being sealingly attachable to the cover member 13 as above described. Body member 15 has a generally circular cross sectional shape, the hollow aspect thereof providing for the feature of a separation chamber 17.

The cover member 13 includes a cover portion 18 that includes the previously described dual inlet ports 11 and dual outlet ports 12 which are arranged in a spaced and parallel orientation to each other and in line with the direction of fuel flow tubes connected thereto (not shown) and generally perpendicular to a central vertical plane of the separator 10. The spaced and parallel orientation of the inlet and outlet ports, 11 and 12, are shown more clearly in FIG. 3. While dual ports are common in some separators, the invention is not limited to dual ports. In other words a single inlet 11 and a single outlet 12 can be used. The preferred feature being that the flow of a liquid, such as diesel fuel, enters an inlet port 11 arranged generally tangential to the round configuration of the cover portion 18.

Cover portion 18 is configured to provide an outlet flow channel 19 that receives flow from a filter element 21 and communicates with the outlet ports. Outlet flow channel 19 is generally of a circular cross sectional shape extending axially in line with the central axis of separator 10. Cover portion 18 is also configured to provide an inlet flow channel 22 that is flow separated from the outlet flow channel 19. Inlet flow channel 22 communicates with inlet ports 11 and separation chamber 17. Inlet flow channel 22 is generally of an annular cross sectional shape that surrounds the outlet flow channel 19. Accordingly, a cylindrical wall member 23 separates the inlet channel 22 and outlet channel 19. The filter element 21 is well known in the art and provides the interface between the incoming fuel and the outgoing fuel within the bowl 15. Such configurations are well known in the art.

A disc-shaped flow dispersion member 24 is fitted across or between the inlet flow channel 22 and the separation chamber 17 approximately at the lower end of cover portion 18. The filter element 21 is located below the flow dispersion member 24 and within chamber 16. A seal 25 is provided at the top rim of filter element 21 and a lower radially inward surface of the flow dispersion member 24 where the top rim of the filter element 21 fits up against the flow dispersion member 24. A fastener, such as the above described bolt member 26 is fitted within a central hole 27 in the cover portion 18 with a lower surface of the head of the bolt 26 in contact with the top surface of a boss member 28 provided on the upper surface of cover portion 17. Bolt member 26 extends downward through outlet channel 19, through a hole 29 in the flow dispersion member 24, through and out of the interior of filter element 21. A nut 31 is threaded onto the threaded shank of bolt 26 below the filter element 21 with a sealing washer 32 therebetween. Tightening of the nut 31 firmly clamps the filter element 21 and the flow dispersion member 24 to the underside of the cover portion 18 It is to be noted that tightening of the nut 31 is independent of the tightening of the sleeve 33 to the threaded lower portion of the bolt 26. Thus, the sealing attachment of the filter element 21 to the cover member 13 occurs before the body 17 is sealingly clamped to the cover member 13. Seals located between the head of bolt 26 and the boss 28, between the downwardly extending edge of wall 22 and the top surface of the flow dispersion member 24, between the lower surface of the flow dispersion member 24 and the upper rim of filter element 21, and between the a lower surface of the filter element 21 and the nut 31 serve to seal the inlet flow from the outlet flow through the separator 10 when the nut 31 is tightened. With the exception of the presence of the flow dispersion member 24, such sealing arrangement is known in the art.

As noted, the inlet ports 11 are in flow communication with the interior of inlet channel 22 which is situated directly above the flow dispersion member 24 and is of generally an annular horizontal cross section, extending around the outlet channel 19. The inlet ports 11 are offset from the vertical axis of the separator 10 such that their axes pass to one side of the outlet channel 19 and generally tangential to the annular inlet channel 22. In this way the flow coming into the inlet channel 21 (it being remembered that only one inlet port is used in an application of the separator 10) adopts a circulatory or swirling motion around and within the inlet channel 22 as it descends through the inlet channel 21 towards the flow dispersion member 24.

As shown and described, the outlet ports 12 communicate with the outlet flow channel 19 that is separated from the inlet channel 22 by a wall 23. The lower end of the wall 23 abutts the upper surface of the disc-shaped flow dispersion member 24, with an appropriate seal therebetween. Of course, all seals used with the separator 10 are made from a material that is impervious to fuel. In accordance with the seal between the upper rim of the filter element 21 and the lower surface of the flow dispersion member 24, and the seal between the lower end of wall 23 and the upper surface of the flow dispersion member 24, the outlet flow through the filter element 21, through the hole 29 in the flow dispersion member 24, and the outlet chamber 19 is prevented from communicating with the inlet flow through the inlet chamber 22. In other words, the inventive arrangement with the flow dispersion member 24 in place, provides for separation of the inlet and outlet flow of fuel through the separator 10.

Figure 5:
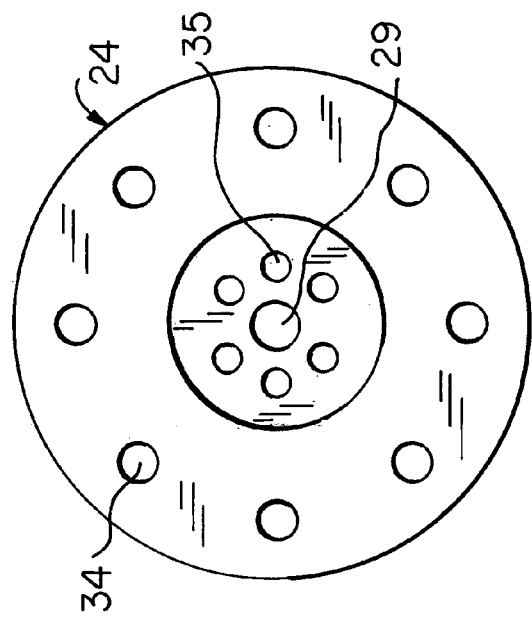
FIG. 5 is a horizontal view of one embodiment of the flow distribution member according to the present invention.
Figure 6:
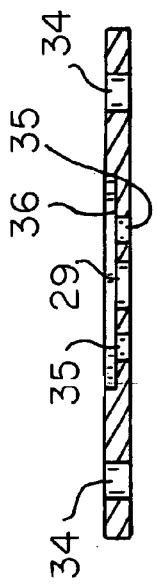
FIG. 6 is a vertical section view of the flow distribution member of FIG. 5.

FIGS. 5 and 6 illustrate one embodiment of the disc-shaped flow dispersion member 24 having eight inlet 34 and eight outlet 35 flow openings through the thickness of the flow dispersion member 24. As depicted, the flow dispersion member can be a machined component; however, a formed flow dispersion member is also satisfactory. The eight inlet openings 34 are generally circular in shape, are spaced apart at regular intervals, and are equidistant from the center of the flow dispersion member 24 as seen in FIG. 5. Inlet openings or apertures 34 form eight flow paths or channels between the inlet flow channel 22 and the separation chamber 17. Inward of the flow channels 34, the flow dispersion member 24 includes eight circular outlet openings or apertures 35 surrounding a further, central opening or aperture 29. Opening 29 provides for passage of the bolt 26 therethrough as described above. The outlet openings 34 form eight flow paths between inside of the filter element 21 and the outlet flow channel 19.

The flow dispersion member 24 can include, on the upper surface thereof, a shallow circular recess 36, having a diameter large enough to fit therewithin the lower end of the wall 23. As previously described a seal is placed at this location to separate the inlet flow channel 22 from the outlet flow channel 19. In this manner, the outlet apertures 35 and the central aperture 29 are sealingly positioned within the recessed area 36 so that in use, flow does not communicate between the inlet flow channel 22 and the outlet flow channel 19 at the location where the end of wall 23 abutts the flow dispersion member 24. In another respect, the recessed area 36 serves to locate the flow dispersion member 34 relative to the cover member 13. Alternatively, an annular groove (not shown) can be provided in the upper surface of the flow dispersion member 24 radially outward from the flow openings 35 so as to provide for the use of an O-ring seal therewithin to separate the inlet and out flows. While the recessed area 36 and the seal at the bottom of wall 23 are preferred, the same are not critical to the operation and scope of the invention. For example, a completely flat flow dispersion member can be used without a seal between the wall 23 and the inventive flow dispersion member 24 will serve the purpose of the invention, but perhaps with some leakage and a lesser efficiency.

As seen in the figures, the flow dispersion member 24 includes a substantially circular outer diameter and a relatively thin thickness. The thickness having no particular dimension, but not being too thin to deflect during operation or assembly, nor too thick so as to complicate the overall configuration of the separator 10. The determination of an appropriate thickness for the flow dispersion member 24 is well within the knowledge of one skilled in the art. Similarly, the size, the number, and location of the inlet and outlet openings 34 and 35 are not of any particular or required configuration or dimension. The main criteria is that the turbulence within the separation chamber be reduced sufficiently to provide for the improved removal of water from the medium flowing through the separator and that neither the inlet openings 34 nor the outlet openings 35 further restrict the flow through the separator. Some preferred guidance is described below and is otherwise easily determined by simple trial and error testing as is also well known to one skilled in the art.

In practice the number of flow channels 34 or 35 can vary from approximately four to twelve. Although regular spacing is preferred, the spacing of the flow channels 33 can be varied so long as the flow through one flow channel does not adversely affect the flow through the other flow channels. Also, while the drawings show the flow channels to have a circular shape, other shapes can be used. Additionally, not all of the flow channels need to have the same sized openings. The actual configuration of the flow channels 34 can be varied, for example, the inlet and or the outlet can be chamfered or rounded, the hole can be tapered, as well as other like configurations The flow dispersion member 24 in association with the inlet flow channels 34 serve a number of different functions in the inventive separator 10. For example, they serve to even out the flow into the inlet channel such that the intended circulatory motion of the incoming fuel is maintained. They serve to control and evenly disperse the flow of the fuel into the separation chamber 17 and thereby reduce or prevent turbulence within the separation chamber 17. The performance of these functions has a significant and beneficial effect on the ability of the inventive separator 10 to remove water from the incoming fuel and to prevent redispersion of water back into the fuel.

As noted, the flow channels 34 may have a tapering shape, narrowing in the flow direction, so that the heavier fraction liquid (the water) is encouraged through the flow channels 34. One or more of the flow channels 34 can have an associated sloped region of the surface of the member adjacent the inlet side opening of the flow channel for this reason. With this configuration, the water that has been separated in the inlet flow channel 22, for example due to a centrifugal force created by a swirling flow therein, and that has agglomerated to a certain extent and collected on the flow dispersion member 24, is encouraged through the inlet flow channels 34 by its weight in relation to the lighter fraction of the fuel. As shown, the remainder of the inlet side of the flow dispersion member 24 is substantially flat so as to prevent the flow dispersion member 23 from interfering in an undesirable way with the flow of the liquid in the inlet channel 22. However, prototype testing has shown that straight through holes, without any special features, operate very satisfactory as the flow inlet channels 34. Thus, the special features of the inlet flow hole 34 are not an essential aspect of the present invention, but are intended to be included within the scope of the present invention.

Figure 7:
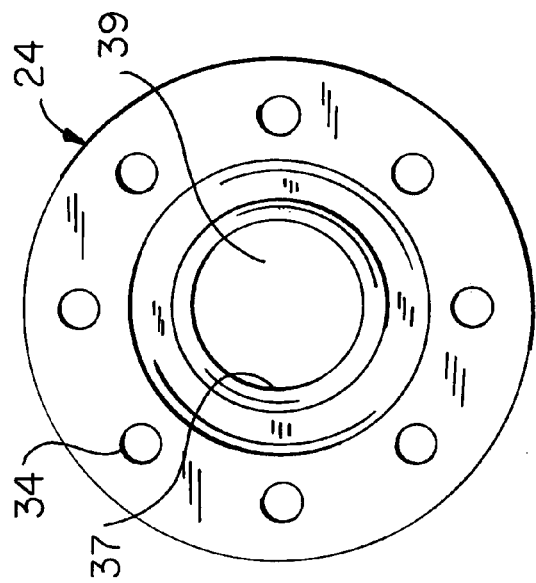
FIG. 7 is a horizontal view of a second embodiment of the flow distribution member according to the present invention; and, FIG. 8 is a vertical section view of the flow distribution member of FIG. 7.
Figure 8:

FIGS. 7 and 8 show a horizontal view and vertical section view through another embodiment of a flow distribution or dispersion member 24, which can be used in conjunction with the liquid separator described above. In this embodiment, the flow dispersion member 24 comprises a formed circular plate having eight inlet flow channels 34 spaced apart at regular intervals, and equidistant from the center of the flow dispersion member 24. When used in conjunction with the liquid separator embodiment described above, the flow channels 34 in this embodiment also form flow paths between the inlet channel 22 and the separation chamber 17, and serve the same function as described in the above embodiment. The flow dispersion member 24 shown in FIGS. 7 and 8 includes an indented or recessed portion 38 at the center of the flow dispersion member 24, having a single outlet opening 39 therethrough. The outlet aperture 39 receives the bolt 26 through its middle, leaving space around the bolt for a single outlet flow path. In this manner, the outlet aperture 39 forms a single flow path, around the bolt 26, between inside of the filter element 21 and the outlet flow channel 19. The indention 38, in this embodiment, serves the same sealing and locating function as the recessed area 36 in the embodiment of FIGS. 5 and 6. Further, the single outlet opening 39 serves the same function as the multiple outlet openings 35 and the bolt hole 29 of FIGS. 5 and 6. In this embodiment an innermost rim 37 of the opening 39 in the flow dispersion member can be adapted to closely fit therewithin, the lower end of the wall 23 thereby forming a surface to surface seal, and eliminating the need for the indented portion 38. With either configuration of the recessed portion 38, the outlet flow channel 39 through the flow dispersion member 24 is completely within the sealed area. Therefore with either configuration of the recessed portion 38, flow is not communicable between the inlet channel 22 and the outlet channel 19 other than through the separation chamber 17 and the filter element 21. Thus, it is seen that the flow dispersion member 24 can have a number of alternative configurations, each of can be effectively used with the separator 10.

Preferably the sum of the areas of the inlet flow channels 34 is between the approximate range of 2% to 25% of the total area of the flow dispersion member presented to the inlet side of the flow dispersion member. In other words between the approximate range of 2 to 25% of the flow area between the inner diameter of the body 15 and the outer diameter of the filter element 21. The main aspect being the ability of the inlet flow channels 34 to significantly reduce the turbulence of the flow of fuel into, within, and out of the separation chamber 17. Preferably, the sum of the areas of the outlet flow channels or openings 35 is approximately the same as the area of the outlet flow channel 19 but not less than the inlet openings of the filter element 21. In this regard the use of the flow dispersion member 24 of having the large central opening 39 is preferable. It being noted that the large central opening 39 can be provided with a machined or a formed flow dispersion member 24. Where a flow dispersion member having a plurality of outlet flow channels 35 is used, good practice would align the outlet flow channels 34 with the inlet flow channels of the filter element 21. The most effective and efficient sum of the areas of the inlet and outlet openings can be easily determined by one ordinarily skilled in the art or by simple testing. In prototype testing with a water separator having a bowl 15 of approximately 3 inches in diameter and a length of about 3½ inches, a flow dispersion member 24 having an outer diameter of approximately 2½ inches, eight inlet flow openings, each about 3/16 inches in diameter, a central opening of about 7/8 inch, and a thickness of about 0.025 inches was determined to perform satisfactorily.

The filter element 21 is of generally conventional form, and in use, the medium having the water removed therefrom is drawn radially inwardly through the filter 21 from the separation chamber 17, and then upward through the outlet apertures 35, or 29, into the outlet flow channel 19, and then out of the liquid separator 10 through either one of the outlet ports 12. However, as explained above, even a prior art filter element 21 will perform better because of the effect of the flow dispersion member 24 in substantially reducing the smaller and more evenly distributed water particles that in the prior art are redispersed back into the fuel within the separation chamber 17.

In accordance with the above described configuration of inlet ports 11 and the inlet flow channel 22, the flow entering the inlet flow channel 22 from the inlet port 11 selected to be used adopts a circulatory or swirling motion within the inlet flow channel 22, as bounded by wall 23 of the outlet flow channel 19, as it descends within the inlet channel 22 towards the flow dispersion member 24. In this circulatory flow, water being the heavier component of the fuel tends to be separated by the induced centrifugal action and falls through the flow dispersion member 24 collecting at the bottom of the separation chamber 17. In the absence of the flow dispersion member 24, (i.e. the prior art separators) any such water that is separated from the fuel will also collect at the bottom of the separation chamber. However, this separation effect is limited, by the turbulence in the separation chamber. Moreover, without the flow dispersion member 24, the turbulent flow in the separation chamber causes break-up and redispersion of the collected water back into the fuel.

Thus, in the absence of the flow dispersion member 24 as provided herein, the liquid fuel exiting from the separation chamber 17 and into and through the filter element 21 contains an undesirable amount of water. Even further, the redispersion of the water back into the fuel is more problematic in that the redispersed water is more finely distributed throughout the fuel which reduces the effectiveness of the filter element 21. In contrast, the flow dispersion member 24 as provided by the present invention, having the array of inlet flow channels 34, serves to more evenly distribute and control the flow into the separation chamber 17, thereby significantly reducing the turbulence within the separation chamber 17. The significantly reduced turbulence thusly prevents the collected water in the separator chamber 17 from being redispersed or reintroduced into the fuel entering the filter element 21, which not only better serves the separation of the water from the fuel but also allows the filter element 21 to better perform because of the absence of the more finely distributed water particles.

Additionally, as explained above, the flow dispersion member 24 serves to isolate the swirling motion of the incoming flow to within in the inlet region 22, thus preserving the beneficial effect of centrifugal separation of water in this region. The water effectively separated in the inlet channel 22 easily falling through the inlet openings 34 and collecting at the bottom of the separation chamber 17. Accordingly, the flow dispersion member 24 serves in at least three different ways to more efficiently separate the water from the fuel.

The water that has been separated from the fuel and settled in the bottom of the separation chamber 17 may be removed from time to time by loosening a release member that is threadingly fitted within an opening in the bottom of the container body 15 so as to loosen a sealing member to allow the water to exit through the opening and out of the separator 10.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein to one skilled in the art, are particularly reserved especially as they fall within the breadth and scope of the claims here appended. The above embodiments have been described by way of example only.

The invention claimed is:

1. Liquid separator apparatus for separating water from a mixture of water and fuel, comprising:
    a cover including a flow inlet channel and a flow outlet channel,
    a bowl member attachable to said cover, said bowl member having a hollow internal configuration, said internal configuration comprising a separation chamber, and
    a disc-like flow dispersion member; said flow dispersion member located between the cover and the separation chamber and positioned substantially perpendicular to a longitudinal axis of the bowl member, the flow dispersion member including a plurality of flow inlet paths in flow communication with the flow inlet channel and the separation chamber.

2. The apparatus of claim 1 wherein said flow dispersion member includes one or more flow outlet paths in flow communication with said flow outlet channel, said flow inlet paths comprising openings through the plane of the disc at a first radial location and said one or more flow outlet paths comprising openings through the plane of the disc at a second radial location said flow inlet paths and said one or more flow outlet paths of said flow dispersion member being flow separated from each other.

3. The apparatus of claim 2 including a filter element located within said separation chamber and flow connected to said one or more flow outlet paths in said flow dispersion member.

4. The apparatus of claim 3 wherein an inlet port is flow connected to said cover flow inlet channel and an outlet port is flow connected to said cover flow outlet channel.

5. The apparatus of claim 4 wherein said flow inlet channel has an annular configuration and said inlet port is positioned essentially tangential to said flow inlet channel so as to induce a circulatory motion to an inlet flow of said water and fuel mixture into and within said flow inlet channel.

6. In a water separator adapted to remove water from a fuel, said water separator including a cover configured to include an inlet port in flow communication with a flow inlet channel, and an outlet port in flow communication with a flow outlet channel, a reservoir member attached to said cover, a filter element located within said reservoir member, said reservoir member being in flow communication with said flow inlet and flow outlet channels, the improvement comprising,
    a disc-like flow dispersion member located between said cover and said reservoir member and extending thereacross, said flow dispersion member having a plurality of flow inlet paths in flow communication with said flow inlet channel, and one or more flow outlet paths in flow communication with said flow outlet channel, the flow inlet paths and outlet paths comprising openings through the plane of the flow dispersion member.

7. The improvement of claim 6 including the further improvement of the reservoir being flow connected between said plurality of flow inlet paths and said one or more outlet flow paths of said flow dispersion member.

8. The improvement of claim 7 including the further improvement of said filter element located within the reservoir being flow connected to the one or more flow outlet paths in said flow dispersion member.

9. A method for separating water from a mixture of fuel and water in a liquid separator comprising the steps of:
    flowing said mixture into and through a flow inlet channel;
    flowing said mixture through a disc-like flow dispersion member having a plurality of flow inlet paths through the plane of the disc-like flow dispersion member and into a separation chamber;
    separating the water from the fuel within the separation chamber;
    flowing the water separated fuel through one or more outlet flow paths in said disc-like flow dispersion member; and,
    flowing said water separated fuel through and out of a flow outlet channel.

10. The method of claim 9 including the step of flowing said mixture through an inlet port, said inlet port being connected to and arranged relative to said flow inlet channel to induce a circulatory motion to said flow of said mixture within said flow inlet channel, whereby some water from said mixture flowing within said flow inlet channel is separated from the mixture by centrifugal action.

11. The method of claim 10 including the step flowing the fuel within the separation chamber through a filter element after flowing the fuel through the flow dispersion member.

* * * * *